（12） United States Patent
Huang et al.

(10) Patent No.: US 11,794,447 B2
(45) Date of Patent: Oct. 24, 2023

(54) COMPOSITE MATERIAL STRUCTURE

(71) Applicants: Han-Ching Huang, Taipei (TW); Jung-Chin Wu, Taipei (TW); Kuo-Nan Ling, Taipei (TW); Sheng-Hung Lee, Taipei (TW)

(72) Inventors: Han-Ching Huang, Taipei (TW); Jung-Chin Wu, Taipei (TW); Kuo-Nan Ling, Taipei (TW); Sheng-Hung Lee, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 17/722,406

(22) Filed: Apr. 18, 2022

(65) Prior Publication Data

US 2022/0332087 A1  Oct. 20, 2022

Related U.S. Application Data

(60) Provisional application No. 63/176,360, filed on Apr. 19, 2021.

(51) Int. Cl.
*B32B 27/08* (2006.01)
*B32B 7/022* (2019.01)

(52) U.S. Cl.
CPC .............. *B32B 7/022* (2019.01); *B32B 27/08* (2013.01); *B32B 2250/03* (2013.01);
(Continued)

(58) Field of Classification Search
CPC ............ B32B 2250/03; B32B 2250/05; B32B 2250/20; B32B 2250/40; B32B 2260/023; B32B 2260/046; B32B 2262/06; B32B 2262/101; B32B 2262/106; B32B 2262/16; B32B 2305/10; B32B 2305/22; B32B 2307/54; B32B 2307/546; B32B 2307/718; B32B 2307/72; B32B 2457/00; B32B 27/08; B32B 5/02; B32B 5/022;
(Continued)

(56) References Cited

U.S. PATENT DOCUMENTS 11,001,033 B2   5/2021  Hatanaka et al.
2004/0204533 A1* 10/2004 Huner ................... C04B 35/565
                                              524/495

FOREIGN PATENT DOCUMENTS

CN    108472838    8/2018
TW    201736098    10/2017
(Continued)

OTHER PUBLICATIONS

"Office Action of Taiwan Counterpart Application", dated Nov. 24, 2022, p. 1-p. 15.

*Primary Examiner* — Lawrence D Ferguson
(74) *Attorney, Agent, or Firm* — JCIPRNET

(57) ABSTRACT

A composite material structure includes a first fiber layer, a second fiber layer, and a third fiber layer. The first fiber layer is composed of a first long fiber and a first resin material. The second fiber layer is composed of a second long fiber and a second resin material. The third fiber layer is disposed between the first fiber layer and the second fiber layer. The third fiber layer is composed of a short fiber and a third resin material. A length of the first long fiber and a length of the second long fiber are both greater than a length of the short fiber, and the length of the short fiber is less than or equal to 25 mm.

17 Claims, 2 Drawing Sheets

(52) U.S. Cl.
CPC ....... *B32B 2250/05* (2013.01); *B32B 2250/40* (2013.01); *B32B 2262/106* (2013.01); *B32B 2305/10* (2013.01); *B32B 2305/22* (2013.01); *B32B 2307/546* (2013.01); *B32B 2307/718* (2013.01); *B32B 2307/72* (2013.01)

(58) Field of Classification Search
CPC .. B32B 5/12; B32B 5/265; B32B 7/02; B32B 7/022; G02B 2027/0138; G02B 27/0172; G06F 3/011; G06F 3/012; G06T 2207/30244; G06T 3/0006; G06T 7/73; G06T 7/74
See application file for complete search history.

(56) References Cited

FOREIGN PATENT DOCUMENTS

| | | |
|---|---|---|
| TW | 201825278 | 7/2018 |
| TW | 201834843 | 10/2018 |

* cited by examiner

COMPOSITE MATERIAL STRUCTURE

CROSS-REFERENCE TO RELATED APPLICATION

This application claims the priority benefit of U.S. provisional application Ser. No. 63/176,360, filed on Apr. 19, 2021. The entirety of the above-mentioned patent application is hereby incorporated by reference herein and made a part of specification.

BACKGROUND OF THE INVENTION

Field of the Invention

The invention relates to a composite structure, and more particularly, to a composite material structure.

Description of Related Art

With the changes in consumers' living and working behavior, electronic devices such as smart phones, tablet computers, e-book readers, and notebook computers have become mainstream in the current market. More specifically, the casings of these electronic devices must have sufficient structural strength to provide adequate protection. Therefore, it is always an important issue for relevant manufacturers to develop materials that may enable the casings of electronic devices to have sufficient structural strength.

SUMMARY OF THE INVENTION

The invention provides a composite material structure, and the casing of the electronic device made by the composite material structure may have sufficient structural strength.

A composite material structure of the invention includes a first fiber layer, a second fiber layer, and a third fiber layer. The first fiber layer is composed of a first long fiber and a first resin material. The second fiber layer is composed of a second long fiber and a second resin material. The third fiber layer is disposed between the first fiber layer and the second fiber layer. The third fiber layer is composed of a short fiber and a third resin material. A length of the first long fiber and a length of the second long fiber are both greater than a length of the short fiber, and the length of the short fiber is less than or equal to 25 millimeters (mm).

In an embodiment of the invention, the length of the short fiber is greater than or equal to 5 mm.

In an embodiment of the invention, a material of the short fiber includes a carbon fiber, a glass fiber, a plant fiber, or a combination thereof.

In an embodiment of the invention, the carbon fiber includes a polyacrylonitrile-based (PAN-based) carbon fiber and a pitch-based carbon fiber.

In an embodiment of the invention, a ratio of the PAN-based carbon fiber to the short fiber and a ratio of the pitch-based carbon fiber to the short fiber are both between 20 wt % and 80 wt %.

In an embodiment of the invention, the ratio of the pitch-based carbon fiber to the short fiber is greater than the ratio of the PAN-based carbon fiber to the short fiber.

In an embodiment of the invention, the third fiber layer is a single-layer structure.

In an embodiment of the invention, the third fiber layer is a multi-layer structure.

In an embodiment of the invention, the multilayer structure includes a first portion, a second portion, and a third portion, and the first portion is adjacent to the first fiber layer, the second portion is adjacent to the second fiber layer, and the third portion is located between the first portion and the second portion.

In an embodiment of the invention, a density of the first portion is equal to a density of the second portion and greater than a density of the third portion.

In an embodiment of the invention, a ratio of the density of the first portion to the density of the third portion is between 1 and 1.3.

In an embodiment of the invention, a flexural modulus of elasticity of the first portion is equal to a flexural modulus of elasticity of the second portion and greater than a flexural modulus of elasticity of the third portion.

In an embodiment of the invention, a ratio of the flexural modulus of elasticity of the first portion to the flexural modulus of elasticity of the third portion is between 1 and 3.

In an embodiment of the invention, the third portion is a multi-layer structure.

In an embodiment of the invention, the first portion and the second portion are arranged symmetrically with the third portion.

In an embodiment of the invention, the first resin material, the second resin material, and the third resin material include a thermoplastic resin, a thermosetting resin, or a combination thereof.

In an embodiment of the invention, the thermoplastic resin includes polycarbonate (PC), polyethylene terephthalate (PET), poly(methyl methacrylate) (PMMA), polyethylene (PE), acrylonitrile butadiene styrene (ABS), polypropylene (PP), polystyrene (PS), polyamide (PA), or a combination thereof, and the thermosetting resin includes an epoxy resin, a phenolic resin, or a combination thereof.

In an embodiment of the invention, a material of the first long fiber and a material of the second long fiber include a carbon fiber, a glass fiber, a plant fiber, or a combination thereof.

In an embodiment of the invention, a fiber area weight (FAW) of the third fiber layer is between 10 grams and 300 grams per square meter.

Based on the above, the composite material structure of the invention includes a first fiber layer, a second fiber layer, and a third fiber layer with different fiber lengths, and has the design that the first fiber layer and the second fiber layer include a long fiber and the third fiber layer includes a short fiber. The rigidity of the material is improved using the synergistic effect of different fiber layers in performance. Therefore, the casing of the electronic device made of the composite material structure may have sufficient structural strength.

In order to make the aforementioned features and advantages of the disclosure more comprehensible, embodiments accompanied with figures are described in detail below.

DESCRIPTION OF THE EMBODIMENTS

Figure 1A:
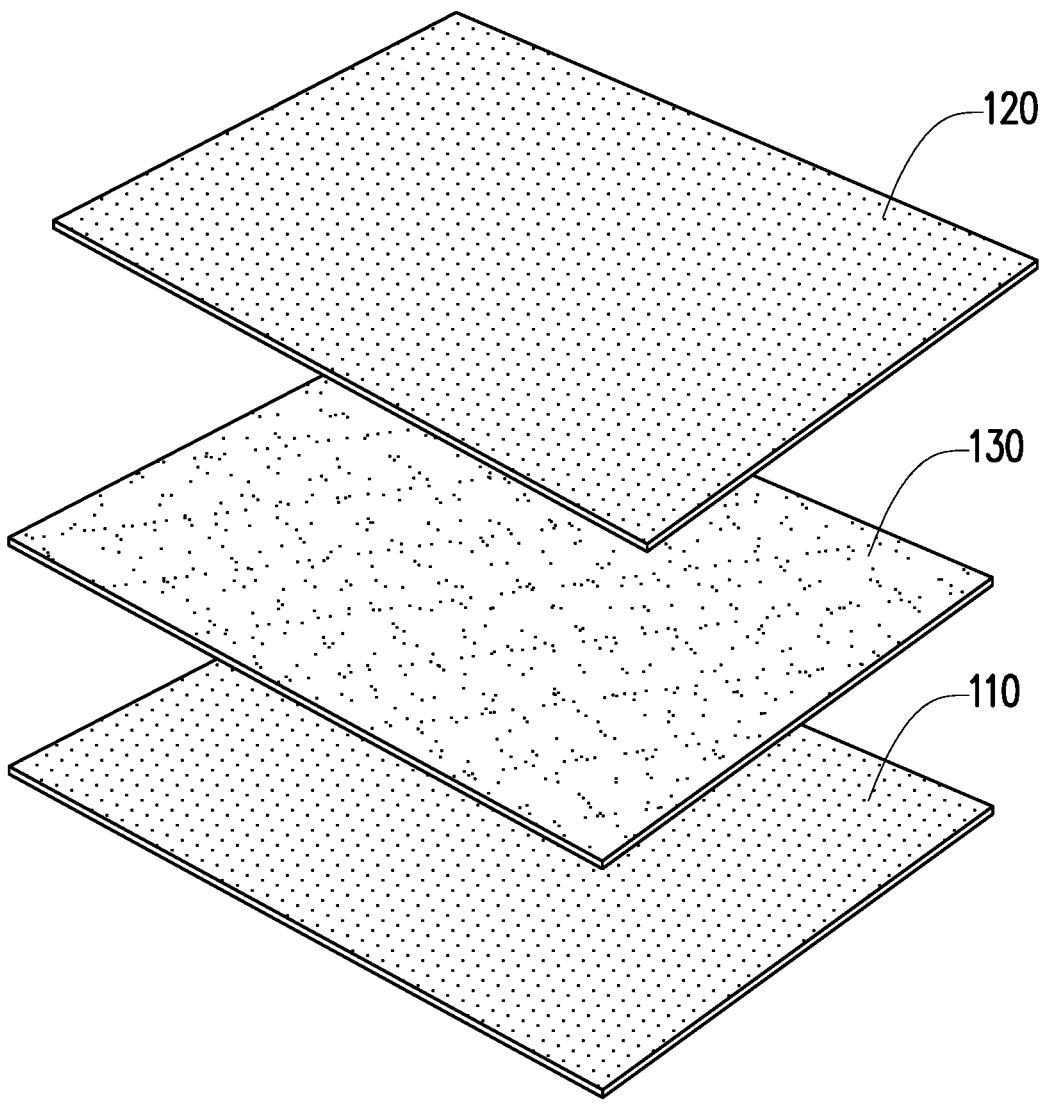
FIG. 1A is an exploded schematic view of a composite material structure according to an embodiment of the invention.

Hereinafter, the preferred embodiments of the invention will be described in detail by adding reference numerals and illustrated in the drawings. Where possible, the drawings omit unnecessary members for clarity. In addition, the element sizes in the drawings are drawn for convenience of description and do not represent actual element size ratios.

Directional terms (e.g., up, down, right, left, front, back, top, bottom) as used herein are used for reference only as shown in the drawings and are not intended to imply absolute orientation.

It should be understood that, even though terms such as "first", "second", "third", etc., in the specification may be used herein to describe various components, members, regions, layers, and/or parts, these components, members, regions, and/or parts should not be limited by these terms. These terms are only used to distinguish one device, member, region, layer, or part from another device, member, region, layer, or part.

Figure 1B:
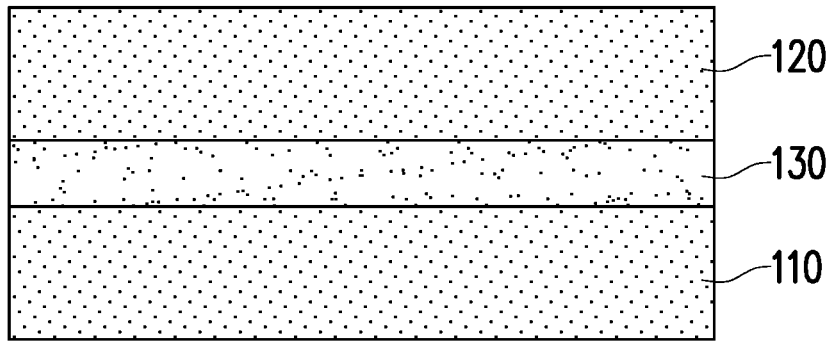
FIG. 1B is a cross-sectional schematic view of a composite material structure according to an embodiment of the invention.

FIG. 1A is an exploded schematic view of a composite material structure according to an embodiment of the invention. FIG. 1B is a cross-sectional schematic view of a composite material structure according to an embodiment of the invention. Referring to FIG. 1A and FIG. 1B, in the present embodiment, a composite material structure 100 includes a first fiber layer 110, a second fiber layer 120, and a third fiber layer 130, wherein the third fiber layer 130 is disposed between the first fiber layer 110 and the second fiber layer 120. More specifically, the first fiber layer 110 is composed of a first long fiber and a first resin material; the second fiber layer 120 is composed of a second long fiber and a second resin material; and the third fiber layer 130 is composed of a short fiber and a third resin material. Moreover, the length of the first long fiber and the length of the second long fiber are both greater than the length of the short fiber, and the length of the short fiber is less than or equal to 25 mm. Accordingly, the composite material structure 100 of the present embodiment includes the first fiber layer 110, the second fiber layer 120, and the third fiber layer 130 with different fiber lengths, and has the design that the first fiber layer 110 and the second fiber layer 120 include a long fiber and the third fiber layer 130 includes a short fiber. The rigidity of the material is improved using the synergistic effect of different fiber layers in performance. Therefore, the casing of the electronic device made of the composite material structure 100 may have sufficient structural strength.

In an embodiment, the first fiber layer 110 and the second fiber layer 120 may correspond to the long side or the short side of the product according to the requirements of the product (such as a smart phone or a notebook computer, etc.) and adopt a continuous fiber layer formed of an uncut long fiber. The third fiber layer 130 may be a discontinuous fiber layer (which may be referred to as a non-woven mat) formed by cutting a long fiber into a plurality of short fiber segments (with a length of less than or equal to 25 mm) and then re-forming, but the invention is not limited thereto.

It should be noted that the invention does not limit cutting to the length of a plurality of short fiber segments, and the third fiber layer 130 may be remade with the same or different lengths, and any length of each segment less than or equal to 25 mm falls within the scope of the invention. In addition, the invention is not limited to a short fiber of a single type, density, or weight, and the third fiber layer 130 may be reformed by using short fibers of various types, densities, or weights.

More specifically, during the manufacturing process of the third fiber layer 130, the directional degree of the fiber (corresponding to the water flow direction in the reforming process) may be controlled, so that the machine direction (MD) and the transverse direction (TD) have different moduli, and the modulus ratio (MD/TD) of the machine direction and the transverse direction may be greater than 2 or more. For example, in an embodiment, the modulus in the machine direction is 19.9 GPa, and the modulus in the transverse direction is 9.6 GPa, but the invention is not limited thereto. In actual product application, different orientation configurations may be achieved based on structural requirements. Here, the machine direction and the transverse direction may be perpendicular to each other.

In an embodiment, depending on the product applied, the length of the first long fiber used in the first fiber layer 110 and the length of the second long fiber used in the second fiber layer 120 are greater than the length of the short fiber used in the third fiber layer 130, and the length of the short fiber used in the third fiber layer 130 may be greater than or equal to 5 mm (therefore, the length of the short fiber used in the third fiber layer 130 may be any value between 5 mm and 25 mm, such as 10 mm, 15 mm, 20 mm, etc.) However, the invention is not limited thereto, and the fiber lengths may all be adjusted according to the application of actual products (e.g., handheld devices or other IOT products).

In an embodiment, the material of the short fiber includes a carbon fiber, a glass fiber, a plant fiber, or a combination thereof. For example, the material of the short fiber may be a carbon fiber, and the carbon fiber may include a polyacrylonitrile-based carbon fiber and a pitch-based carbon fiber, in order to utilize the synergistic effect of different types of carbon fibers in performance, so as to further improve the overall rigidity of the composite material structure 100. More specifically, as shown in Table 1, compared with the polyacrylonitrile-based carbon fiber, the pitch-based carbon fiber has higher tensile modulus and lower tensile strength and ductility. Therefore, a fiber layer made entirely of the polyacrylonitrile-based carbon fiber has the issue of lower tensile modulus. Furthermore, a fiber layer made entirely of the pitch-based carbon fiber causes the issue of easy fracture of the material due to the low tensile strength and ductility of the pitch-based carbon fiber. Therefore, by designing the polyacrylonitrile-based carbon fiber and the pitch-based carbon fiber in different ratios, the third fiber layer 130 may have a better tensile modulus and at the same time be less prone to material fracture. Here, for example, the ratios above are that both the ratio of the polyacrylonitrile-based carbon fiber to the short fiber and the ratio of the pitch-based carbon fiber to the short fiber are between 20 wt % and 80 wt % (for example, 20 wt %, 40 wt %, 50 wt %, 60 wt %, 70 wt %, 80 wt %, or any value within 20 wt % to 80 wt % above), but the invention is not limited thereto.

TABLE 1

|  | Polyacrylonitrile-based carbon fiber | Pitch-based carbon fiber |
| --- | --- | --- |
| Tensile strength (MPa) | 4900 | 2600 |
| Tensile modulus (GPa) | 230 | 640 |
| Elongation (%) | 2.1 | 0.3 |

Moreover, the tensile modulus of a fiber layer made entirely of the polyacrylonitrile-based carbon fiber is 14.1 GPa; when the ratio of the polyacrylonitrile-based carbon fiber to the short fiber is 50% and the ratio of the pitch-based carbon fiber to the short fiber is 50%, the tensile modulus of the resulting fiber layer is 28.2 GPa; and when the ratio of the polyacrylonitrile-based carbon fiber to the short fiber is 20% and the ratio of the pitch-based carbon fiber to the short fiber is 80%, the tensile modulus of the resulting fiber layer is 36.6 GPa. Therefore, in the carbon fiber used, the ratio of the pitch-based carbon fiber is greater than the ratio of the polyacrylonitrile-based carbon fiber, thus achieving better performance. However, the invention is not limited thereto, and the polyacrylonitrile-based carbon fiber and the pitch-based carbon fiber may be adjusted according to actual design requirements.

In an embodiment, the fiber area weight of the third fiber layer 130 is between 10 grams and 300 grams per square meter (for example, 10 grams, 30 grams, 50 grams, 80 grams, 100 grams, 200 grams, 300 grams, or any value within 10 grams to 300 grams above). Therefore, the composite material structure 100 of the present embodiment may have the advantage of light weight, but the invention is not limited thereto.

In an embodiment, the material of the first long fiber of the first fiber layer 110 and the material of the second long fiber of the second fiber layer 120 include, for example, a carbon fiber, a glass fiber, a plant fiber, or a combination thereof, and the material of the first long fiber and the material of the second long fiber may be the same or different. For example, the material of the first long fiber and the material of the second long fiber may both be carbon fiber, but the invention is not limited thereto.

In an embodiment, the first resin material, the second resin material, and the third resin material include a thermoplastic resin, a thermosetting resin, or a combination thereof, wherein the thermoplastic resin includes polycarbonate, polyethylene terephthalate, polymethyl methacrylate, polyethylene, propylene-butadiene-styrene resin, polypropylene, polystyrene, polyamide, or a combination thereof, and the thermosetting resin includes an epoxy resin, a phenolic resin, or a combination thereof, but the invention is not limited thereto.

In an embodiment, the first fiber layer 110, the second fiber layer 120, and the third fiber layer 130 may be bonded by pressure and temperature pressure, but the invention is not limited thereto.

In an embodiment, the third fiber layer 130 has a single-layer structure, but the invention is not limited thereto. In other embodiments, the third fiber layer may have other different configurations.

It must be noted here that the following embodiments follow the reference numerals and a portion of the contents of the above embodiments, wherein the same or similar reference numerals are used to indicate the same or similar elements, and the description of the same technical content is omitted. For the description of the omitted portions, reference may be made to the above embodiments, which is not repeated in the following embodiments.

Figure 2:
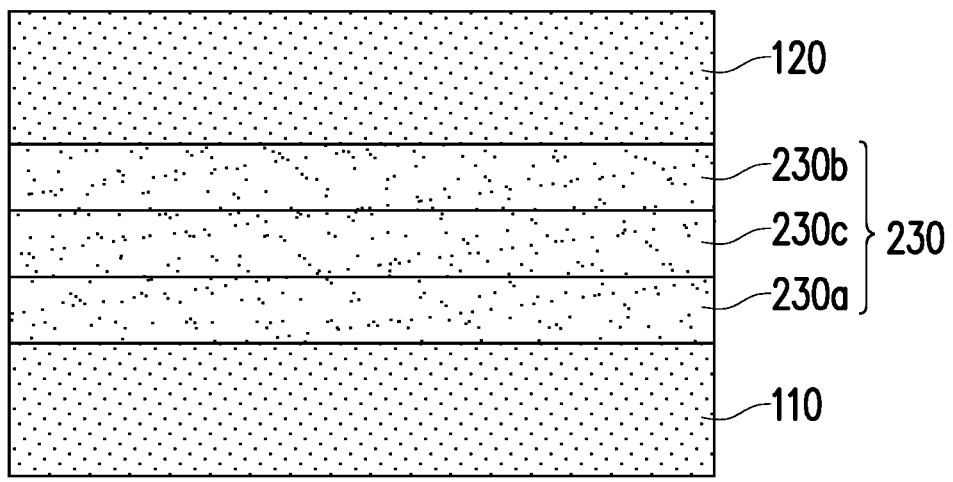
FIG. 2 is a cross-sectional schematic view of a composite material structure according to another embodiment of the invention.

FIG. 2 is a cross-sectional schematic view of a composite material structure according to another embodiment of the invention. Referring to FIG. 2, compared with the composite material structure 100 of FIG. 1B, a third fiber layer 230 of a composite material structure 200 of the present embodiment is a multi-layer structure, and the multi-layer structure includes a first portion 230a, a second portion 230b, and a third portion 230c, wherein the first portion 230a is adjacent to the first fiber layer 110, the second portion 230b is adjacent to the second fiber layer 120, and the third portion 230c is located between the first portion 230a and the second portion 230b.

In the present embodiment, the density of the first portion 230a is equal to the density of the second portion 230b and greater than the density of the third portion 230c. For example, the ratio of the density of the first portion 230a to the density of the third portion 230c may be between 1 and 1.3 (e.g., 1.05, 1.1, 1.15, 1.2, 1.25, or any value within 1 to 1.3 above). Moreover, the flexural modulus of elasticity of the first portion 230a is equal to the flexural modulus of elasticity of the second portion 230b and greater than the flexural modulus of elasticity of the third portion 230c. For example, the ratio of the flexural modulus of elasticity of the first portion 230a to the flexural modulus of elasticity of the third portion 230c may be between 1 and 3 (e.g., 1.5, 2, 2.5, or any value within 1 to 3 above).

Moreover, the first portion 230a and the second portion 230b are arranged symmetrically with the third portion 230c, that is, the first portion 230a and the second portion 230b may have the same composition. In addition, in an embodiment not shown, the third portion 230c may be a multi-layer structure, and therefore the third portion may also have a plurality of portions, but the invention is not limited thereto.

In the present embodiment, when the material of the short fiber used in the third fiber layer 230 is carbon fiber, and the carbon fiber includes the polyacrylonitrile-based carbon fiber and the pitch-based carbon fiber, the ratio of the pitch-based carbon fiber to the short fiber of the first portion 230a and the second portion 230b may be higher than the ratio of the pitch-based carbon fiber to the short fiber of the third portion 230c, but the invention is not limited thereto.

Based on the above, the composite material structure of the invention includes a first fiber layer, a second fiber layer, and a third fiber layer with different fiber lengths, and has the design that the first fiber layer and the second fiber layer include the long fiber and the third fiber layer includes the short fiber. The rigidity of the material is improved using the synergistic effect of different fiber layers in performance. Therefore, the casing of the electronic device made of the composite material structure may have sufficient structural strength. Moreover, the material of the short fiber may be a carbon fiber, and the carbon fiber may include the polyacrylonitrile-based carbon fiber and the pitch-based carbon fiber, in order to utilize the synergistic effect of different types of carbon fibers in performance, so as to further improve the overall rigidity of the composite material structure.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A composite material structure, comprising:
a first fiber layer, wherein the first fiber layer is composed of a first long fiber and a first resin material;
a second fiber layer, wherein the second fiber layer is composed of a second long fiber and a second resin material; and
a third fiber layer disposed between the first fiber layer and the second fiber layer, wherein the third fiber layer is composed of a short fiber and a third resin material, a length of the first long fiber and a length of the second long fiber are both greater than a length of the short fiber, the length of the short fiber is less than or equal to 25 mm, a material of the short fiber comprises a carbon fiber, and the carbon fiber comprises a polyacrylonitrile-based carbon fiber and a pitch-based carbon fiber.

2. The composite material structure of claim 1, wherein the length of the short fiber is greater than or equal to 5 mm.

3. The composite structure of claim 1, wherein a ratio of the polyacrylonitrile-based carbon fiber to the short fiber and a ratio of the pitch-based carbon fiber to the short fiber are both between 20 wt % and 80 wt %.

4. The composite structure of claim 3, wherein the ratio of the pitch-based carbon fiber to the short fiber is greater than the ratio of the polyacrylonitrile-based carbon fiber to the short fiber.

5. The composite structure of claim 1, wherein the third fiber layer is a single-layer structure.

6. The composite structure of claim 1, wherein the third fiber layer is a multi-layer structure.

7. The composite structure of claim 6, wherein the multilayer structure comprises a first portion, a second portion, and a third portion, and the first portion is adjacent to the first fiber layer, the second portion is adjacent to the second fiber layer, and the third portion is located between the first portion and the second portion.

8. The composite structure of claim 7, wherein a density of the first portion is equal to a density of the second portion and greater than a density of the third portion.

9. The composite structure of claim 8, wherein a ratio of the density of the first portion to the density of the third portion is between 1 and 1.3.

10. The composite structure of claim 7, wherein a flexural modulus of elasticity of the first portion is equal to a flexural modulus of elasticity of the second portion and greater than a flexural modulus of elasticity of the third portion.

11. The composite structure of claim 10, wherein a ratio of the flexural modulus of elasticity of the first portion to the flexural modulus of elasticity of the third portion is between 1 and 3.

12. The composite structure of claim 7, wherein the third portion is a multi-layer structure.

13. The composite structure of claim 7, wherein the first portion and the second portion are arranged symmetrically with the third portion.

14. The composite structure of claim 1, wherein the first resin material, the second resin material, and the third resin material comprise a thermoplastic resin, a thermosetting resin, or a combination thereof.

15. The composite material structure of claim 14, wherein the thermoplastic resin comprises polycarbonate, polyethylene terephthalate, polymethyl methacrylate, polyethylene, propylene-butadiene-styrene resin, polypropylene, polystyrene, polyamide, or a combination thereof, and the thermosetting resin comprises an epoxy resin, a phenolic resin, or a combination thereof.

16. The composite material structure of claim 1, wherein a material of the first long fiber and a material of the second long fiber comprise a carbon fiber, a glass fiber, a plant fiber, or a combination thereof.

17. The composite structure of claim 1, wherein a fiber area weight of the third fiber layer is between 10 grams and 300 grams per square meter.

* * * * *